United States Patent
Goto et al.

(10) Patent No.: US 11,238,570 B2
(45) Date of Patent: Feb. 1, 2022

(54) IMAGE PROCESSING DEVICE, IMAGE PROCESSING METHOD, AND IMAGE PROCESSING PROGRAM

(71) Applicant: EIZO Corporation, Hakusan (JP)

(72) Inventors: Kyohei Goto, Hakusan (JP); Takashi Nakamae, Hakusan (JP); Reo Aoki, Hakusan (JP)

(73) Assignee: EIZO Corporation, Hakusan (JP)

( * ) Notice: Subject to any disclaimer, the term of this patent is extended or adjusted under 35 U.S.C. 154(b) by 0 days.

(21) Appl. No.: 16/960,676

(22) PCT Filed: Jan. 29, 2018

(86) PCT No.: PCT/JP2018/002801
§ 371 (c)(1),
(2) Date: Jul. 8, 2020

(87) PCT Pub. No.: WO2019/146122
PCT Pub. Date: Aug. 1, 2019

(65) Prior Publication Data
US 2020/0334796 A1    Oct. 22, 2020

(51) Int. Cl.
*G06T 5/00* (2006.01)
*G06T 7/136* (2017.01)
*G06T 5/50* (2006.01)

(52) U.S. Cl.
CPC ............... *G06T 5/008* (2013.01); *G06T 5/50* (2013.01); *G06T 7/136* (2017.01)

(58) Field of Classification Search
CPC ........... G06T 5/008; G06T 7/136; G06T 5/50; G06T 5/009; H04N 1/6027; H04N 1/407
(Continued)

(56) References Cited

U.S. PATENT DOCUMENTS 7,876,474 B2 * 1/2011 Kondo ..................... G06T 5/40
                                                        358/1.9
9,508,173 B2   11/2016 Miura et al.
(Continued)

FOREIGN PATENT DOCUMENTS

| JP | 2005-515515 A | 5/2005 |
| JP | 2008-104010 A | 5/2008 |
| JP | 2017-37622 A | 2/2017 |

OTHER PUBLICATIONS

International Search Report dated Apr. 10, 2018 in corresponding International application No. PCT/JP2018/002801; 2 pages.
(Continued)

*Primary Examiner* — Amandeep Saini
(74) *Attorney, Agent, or Firm* — Maier & Maier, PLLC

(57) ABSTRACT

An image processing device, an image processing method, and an image processing program capable of appropriately correcting contrast even for an image in which the amplitude of the reflection rate differs for each local area of the image. An image processing device, including a signal intensity extraction unit configured to extract signal intensity of an input image; a peripheral region reference value calculator configured to calculate a peripheral region reference value based on the signal intensity of a peripheral region located around a small region of interest; and an emphasis degree determination unit configured to determine an emphasis degree of the signal intensity so as to increase the signal intensity of the small region, wherein the signal intensity is defined as a reflection rate in the input image input to the image processing device, the small region is defined as a region which is a part of the input image.

4 Claims, 13 Drawing Sheets

(58) Field of Classification Search
USPC .......................................................... 382/173
See application file for complete search history.

(56) References Cited

U.S. PATENT DOCUMENTS

| | | |
|---|---|---|
| 2003/0012448 A1 | 1/2003 | Kimmel et al. |
| 2008/0100858 A1 | 5/2008 | Kaisha |
| 2008/0187235 A1 | 8/2008 | Wakazono et al. |
| 2017/0046817 A1 | 2/2017 | Narumi et al. |

OTHER PUBLICATIONS

Watanabe, T. et al. "Improvement of color quality with modified linear multi-scale retinex," Proceedings of SPIE, vol. 5008, Color Imaging VIII: Processing, Hardcopy, and Applications, Jan. 13, 2003, pp. 59-69, doi: 10.1117/12.472030, Santa Clara, California, United States.
Extended European Search Report dated Dec. 3, 2020, in connection with corresponding EP Application No. 18902028.2; 8 pages.
Korean Office Action dated Mar. 23, 2021, in connection with corresponding KR Application No. 10-2020-7020885 (10 pp., including machine-generated English translation).
Indian Office Action dated Aug. 6, 2021, in connection with IN Application No. 202047036110; 7 pages.

\* cited by examiner

Fig. 8 Input image

Fig. 9 Example

Fig. 10A  Comparative Example 1
Fig. 10B  Comparative Example 2

IMAGE PROCESSING DEVICE, IMAGE PROCESSING METHOD, AND IMAGE PROCESSING PROGRAM

TECHNICAL FIELD

The present invention relates to an image processing device, an image processing method, and an image processing program.

BACKGROUND ART

An image processing method referred to as the Multi-Scale Retinex method using the Retinex theory has been proposed as one of the methods for correcting image contrast and is known as a method for achieving a high visibility improving effect.

CITATION LIST

Patent Literature

[Patent Literature 1] JP-A-2005-515515

SUMMARY OF INVENTION

Technical Problem

In the conventional Multi-Scale Retinex method, since an image is uniformly normalized, it is not possible to appropriately correct the contrast when the amplitude of a reflection rate differs for each local area of the image (for example, see FIG. 10A and FIG. 10B).

The present invention has been made in view of such circumstances and is intended to provide an image processing device, an image processing method, and an image processing program capable of appropriately correcting the contrast even for an image in which the amplitude of the reflection rate differs for each local area of the image.

Solution to Problem

According to one viewpoint of the present invention, provided is an image processing device, comprising: a signal intensity extraction unit configured to extract signal intensity of an input image; a peripheral region reference value calculator configured to calculate a peripheral region reference value based on the signal intensity of a peripheral region located around a small region of interest; and an emphasis degree determination unit configured to determine an emphasis degree of the signal intensity so as to increase the signal intensity of the small region, wherein the signal intensity is defined as a reflection rate in the input image input to the image processing device; the small region is defined as a region which is a part of the input image and comprises at least one pixel; and the emphasis degree is monotonically non-decreasing with respect to a difference between the peripheral region reference value and a predetermined value.

In the image processing device according to the present invention, the signal intensity extraction unit extracts the signal intensity of the input image, the peripheral region reference value calculator calculates the peripheral region reference value based on the signal intensity of the peripheral region located around the small region of interest, and the emphasis degree determination unit determines the emphasis degree of the signal intensity so as to increase the signal intensity of the small region. In addition, the emphasis degree is characterized to be monotonically non-decreasing with respect to the difference between the peripheral region reference value and the predetermined value. With such a configuration, the contrast can be appropriately corrected even for an image in which the amplitude of the reflection rate differs for each local area of the image.

Hereinafter, various embodiments of the present invention will be exemplified. The embodiments described below can be combined with each other.

Preferably, the image processing device satisfies conditions of:

$S \leq T \leq OL$, when $R \geq 0$, and $UL \leq T \leq S$, when $R < 0$ wherein R represents the signal intensity of the small region of interest, S represents the peripheral region reference value, T represents the predetermined value, and OL and UL respectively represent an upper limit and a lower limit of the signal intensity that can be output as an output image.

Preferably, the signal intensity is calculated on the basis of a reflected light component and an illumination light component separated from the input image input to the image processing device.

Further, according to another viewpoint of the present invention, provided is an image processing method, comprising the steps of: extracting signal intensity of an input image; calculating a peripheral region reference value based on the signal intensity of a peripheral region located around a small region of interest; and determining an emphasis degree of the signal intensity so as to increase the signal intensity of the small region, wherein the signal intensity is defined as a reflection rate in the input image input in the method; the small region is defined as a region which is a part of the input image and comprises at least one pixel; and the emphasis degree is monotonically non-decreasing with respect to a difference between the peripheral region reference value and a predetermined value.

In the image processing method according to the present invention, the signal intensity of the input image is extracted in the signal intensity extraction step, the peripheral region reference value is calculated on the basis of the signal intensity of the peripheral region located around the small region of interest in the peripheral region reference value calculation step, and the emphasis degree of the signal intensity is determined in the emphasis degree determination step so as to increase the signal intensity of the small region. In addition, the emphasis degree is characterized to be monotonically non-decreasing with respect to the difference between the peripheral region reference value and the predetermined value. With such a method, the contrast can be appropriately corrected even for an image in which the amplitude of the reflection rate differs for each local area of the image.

Further, according to another viewpoint of the present invention, provided is an image processing program for causing a computer to perform a predetermined function, the predetermined function comprising the functions of: extracting signal intensity of an input image; calculating a peripheral region reference value based on the signal intensity of a peripheral region located around a small region of interest; and determining an emphasis degree of the signal intensity so as to increase the signal intensity of the small region, wherein the signal intensity is defined as a reflection rate in the input image input to the computer; the small region is defined as a region which is a part of the input image and comprises at least one pixel; and the emphasis degree is monotonically non-decreasing with respect to a difference between the peripheral region reference value and a predetermined value.

In the image processing program according to the present invention, the signal intensity of the input image is extracted by the signal intensity extraction function, the peripheral region reference value is calculated on the basis of the signal intensity of the peripheral region located around the small region of interest by the peripheral region reference value calculation function, and the emphasis degree of the signal intensity is determined by the emphasis degree determination function so as to increase the signal intensity of the small region. In addition, the emphasis degree is characterized to be monotonically non-decreasing with respect to the difference between the peripheral region reference value and the predetermined value. With a program causing the computer to perform such functions, the contrast can be appropriately corrected even for an image in which the amplitude of the reflection rate differs for each local area of the image.

BRIEF DESCRIPTION OF DRAWINGS

FIG. 8 shows an example of an input image.

FIG. 9 shows an output image (Example) when image processing is applied by the image processing device according to the embodiment.

FIG. 10A and FIG. 10B show output images (Comparative Examples) when image processing according to a prior art is applied.

DESCRIPTION OF EMBODIMENTS

Hereinafter, embodiments of the present invention will be described in detail with reference to the drawings. In particular, a "unit" in the present specification may refer to, for example, the combination of hardware resources implemented by a circuit in a broad sense and information processing of software specifically realized by these hardware resources.

Further, the circuit in a broad sense is a circuit realized by at least appropriately combining a circuit, a circuitry, a processor, a memory and the like. That is, the circuit in a broad sense may include an application specific integrated circuit (ASIC), a programable logic device (for example, a simple programable logic device (SPLD)), a complex programmable logic device (CLPD), a field programmable gate array (FPGA) and the like.

Further, in the present specification, signal intensity (a logarithmic value) is defined as a reflection rate calculated on the basis of a reflected light component and an illumination light component which are separated from an input image input to an image processing device. Further, a small region is defined as a region that is a part of the input image and comprises at least one pixel. In addition, the image may include a still image or a moving image and refers to one frame in the case of the moving image.

Further, while various kinds of information and a concept including them are dealt with in the embodiments described in detail below, they are represented by the height of a signal value as a bit group of binary numbers composed of 0 or 1, and the communication and operation thereof can be executed on the circuit in a broad sense. Specifically, the information and the concept may include the "small area", "pixel data", "signal intensity", "reflection rate", "peripheral region reference value", "emphasis degree", "brightness" and the like. These will be described again in detail as needed.

1. First Embodiment 1.1 System 1 (Overall Configuration)

Figure 1:
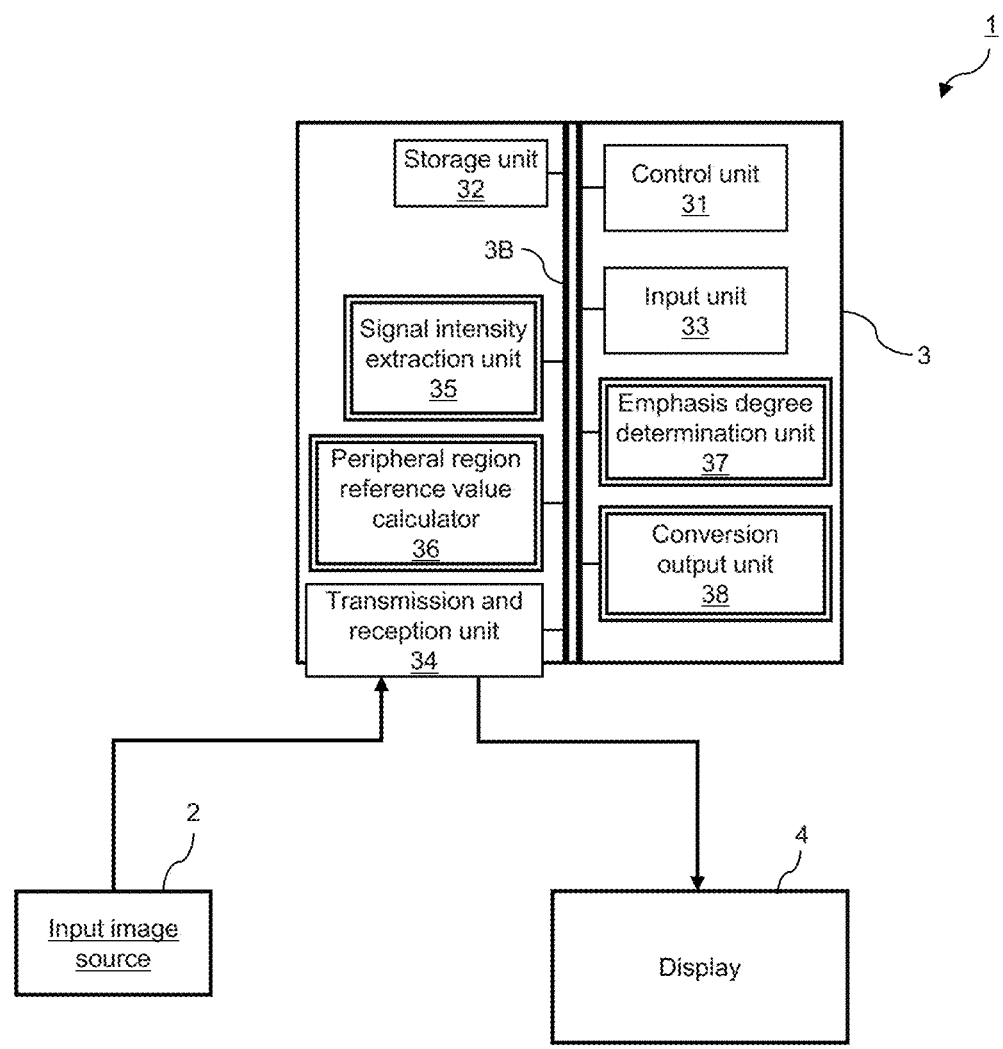
FIG. 1 is a functional block diagram showing a schematic configuration of a system using an image processing device according to an embodiment.

FIG. 1 shows a schematic configuration of a system 1 using an image processing device 3 according to a first embodiment of the present invention. The system 1 comprises an input image source 2, the image processing device 3, and a display 4.

1.1.1 Input Image Source 2

The input image source 2 is configured to output an input image as a target of the image processing of the image processing device 3 and to transmit the input image to a transmission and reception unit 34 (described later) of the image processing unit 3. For example, it may be a general computer or portable terminal, a vision sensor (camera, endoscope system and the like) for visualizing an external situation in real time, or a playback device for playing back a moving image. In this regard, from the viewpoint of information processing, this input image is a two-dimensional pixel aggregate (pixel data array). Although the input image source 2 is illustrated as a separate object from the image processing device 3 in FIG. 1, the configuration is not limited thereto, and the input image source 2 may be included in the image processing device 3.

1.1.2 Image Processing Device 3

The image processing device 3 is a device configured to execute predetermined image processing on image data transmitted from the input image source 2. The image processing device 3 comprises a control unit 31, a storage unit 32, an input unit 33, the transmission and reception unit 34, a signal intensity extraction unit 35, a peripheral region reference value calculator 36, an emphasis degree determination unit 37, and a conversion output unit 38, and these are connected via a communication bus 3B. The components 31 to 38 will be described in detail below.

<Control Unit 31>

The control unit 31 is configured to process and control the overall operation related to the image processing device 3. The control unit 31 is, for example, a central processing unit (CPU) (not shown). The control unit 31 reads out a predetermined program stored in the storage unit 32 to realize various functions related to the image processing device 3 or the system 1. For example, it reads out the predetermined program to display a screen of a graphical user interface (GUI) including a display image of the input image source 2 on the display 4.

In this regard, although the single control unit 31 is illustrated in FIG. 1, the configuration is not limited thereto. A plurality of control units 31 may be provided for each function, and their combination may be also adopted.

<Storage Unit 32>

As described above, the storage unit 32 is configured to store various programs and the like to be realized by the control unit 31. This can be implemented, for example, as a storage device, such as a hard disk drive (HDD) and a solid state drive (SSD). Further, the storage unit 32 can be also implemented as a memory, such as a random access memory (RAM), for storing temporarily necessary information (parameters, arrays and the like) related to program operations, and their combination may be also adopted.

<Input Unit 33>

The input unit 33 may be included, for example, in the image processing device 3 itself or may be externally attached. For example, the input unit 33 can be implemented as a touch panel. Alternatively, a user interface, such as a switch button, a mouse, and a keyboard, may be adopted. An operator's instruction (command) is received via the input unit 33. The instruction is transferred to the control unit 31 via the communication bus 3B, and the control unit 31 can execute predetermined control and operation as needed. As an example of the instruction, the operator can temporarily stop, via the input unit 33, the moving image which is being output by the input image source 2 and displayed on the display 4.

<Transmission and Reception Unit 34>

The transmission and reception unit 34 is a unit for communication between the image processing device 3 and an external device other than the image processing device 3. That is, the image data to be the input image can be received from the input image source 2 via the transmission and reception unit 34, subjected to image processing (described in detail later), and then transmitted to the display 4 as an output image. In this regard, the communication via the transmission and reception unit 34 is not limited to the image data. For example, it is preferable to implement the communication so as to include an appropriate communication standard for a communication target, which is a set of a plurality of communication means, such as wired LAN network communication, Bluetooth communication, and wireless LAN network.

<Signal Intensity Extraction Unit 35>

Figure 2:
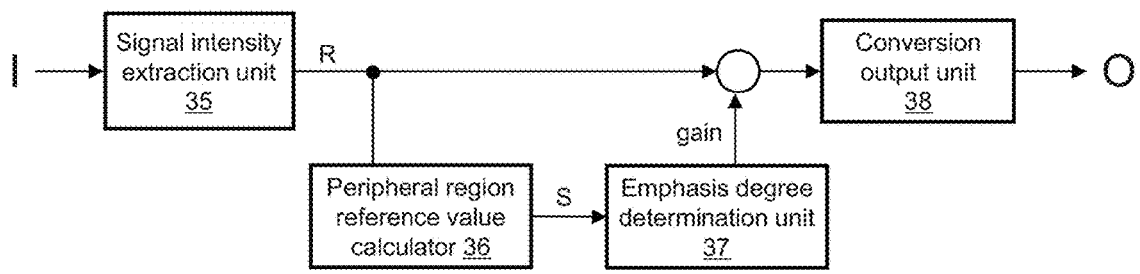
FIG. 2 is a block diagram showing a processing flow by means of a signal intensity extraction unit, a peripheral region reference value calculator, an emphasis degree determination unit, and a conversion output unit.

FIG. 2 is a block diagram showing a processing flow by means of the signal intensity extraction unit 35, the peripheral region reference value calculator 36, the emphasis degree determination unit 37, and the conversion output unit 38 according to the first embodiment of the present invention.

The signal intensity extraction unit 35 is configured to execute an operation related to the Retinex theory on an input image I(x, y) received from the input image source 2 via the transmission and reception unit 34 and to calculate a reflection rate R(x, y) as the signal intensity. In the Retinex theory, the input image I(x, y) is composed of an illumination light component L(x, y) and the reflection rate R(x, y). The illumination light component L(x, y) and the reflection rate R(x, y) are determined as follows.

[Equation 1]
$$L(x, y) = \sum_{n=1}^{N} W_n \{\log[I(x, y) * G_n]\} \quad (1)$$

[Equation 2]
$$R(x, y) = \sum_{n=1}^{N} W_n \{\log[I(x, y)] - \log[I(x, y) * G_n]\} \quad (2)$$

Here, $G_n$ in the equations represents an nth Gaussian filter, and $W_n$ represents its weighting factor. A more specific processing procedure will be described in detail again in Section 1.2. Further, the input image I(x, y) is the reflected light component, and an example in which brightness V(x, y) is used as the input image is be described in the present embodiment.

<Peripheral Region Reference Value Calculator 36>

Figure 3A:
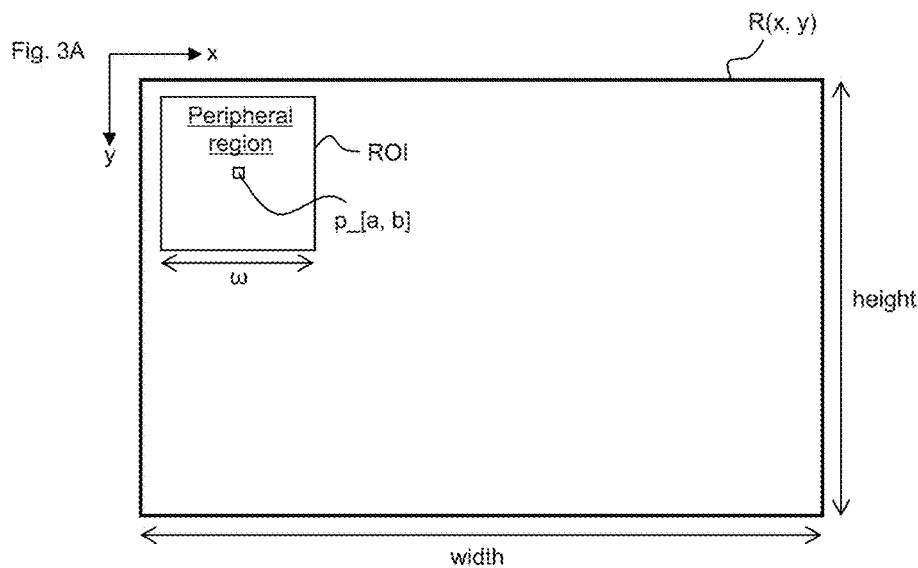
FIG. 3A to FIG. 3C are conceptual diagrams showing an aspect in which the peripheral region reference value calculator determines a peripheral region reference value.
Figure 3B:
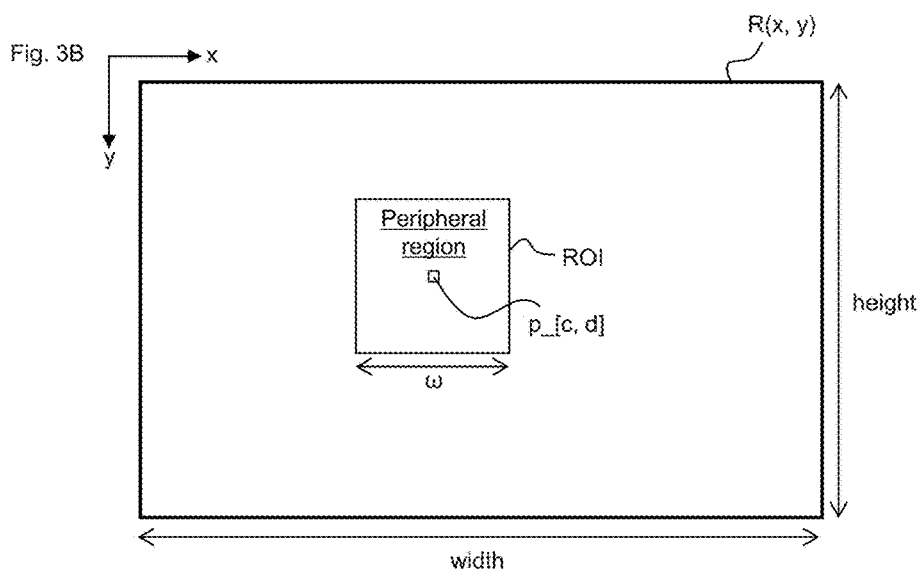
Figure 3C:
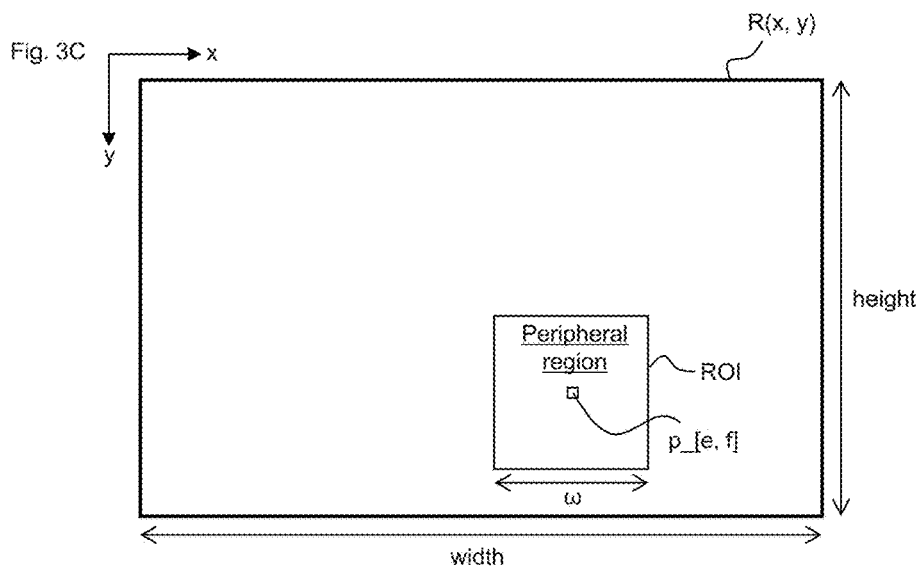

FIG. 3A to FIG. 3C are conceptual diagrams showing an aspect in which the peripheral region reference value calculator 36 determines a peripheral region reference value. As illustrated here, the peripheral region reference value calculator 36 calculates a reference value S(x, y) using the reflection rate R(x, y) extracted by the signal intensity extraction unit 35.

If the input image I(x, y) is an image of width×height [pixels], the reflection rate R(x, y) is also a pixel data array of width×height [pixels]. The ROI (Region of Interest) having ω×ω [pixels] is set for the reflection rate R(x, y). Here, the pixel located at the center of the ROI is referred to as a target pixel p_[i, j] (an example of "the small region of interest" in the claims). In FIG. 3A to FIG. 3C, a target pixel p_[a, b], a target pixel p_[c, d], and a target pixel p_[e, f] are shown as examples of the target pixel j_[i, j].

The peripheral region reference value calculator 36 is configured to generate a pixel data array in which the reflection rate R(i, j) is replaced with the maximum value R_M of the reflection rates R(x, y) of a plurality of pixels (the peripheral region) other than the target pixel p_[i, j] of the same ROI when the reflection rate R(i, j) related of the target pixel p_[i, j] is 0 or more (local_max( )filter). On the other hand, it is also configured to generate a pixel data array in which the reflection rate R(i, j) is replaced with the minimum value R_m of the reflection rates R(x, y) of the plurality of pixels (the peripheral region) other than the target pixel p_[i, j] of the same ROI when the reflection rate R(i, j) of the target pixel p_[i, j] is negative. That is, by performing the above-mentioned processing on all pixels, as shown in FIG. 3A to FIG. 3C, a reference value S(x, y), which is a pixel data array having the maximum value R_M or the minimum value R_m in each ROI as pixel data, is calculated. In this regard, even if the target pixel p_[i, j] is located at the end of the reflection rate R(x, y), this results only in narrowing the peripheral region, and no problem occurs in processing. The processing procedure will be described in detail again in Section 1.2.

The value of ω is preferably determined on the basis of, for example, the width, the height, or the average value of the two. For example, the condition of $0.05 \leq \omega/\alpha \leq 0.50$ is satisfied wherein α represents the width, the height, or the average value of the two. Specifically, for example, ω/α is 0.05, 0.06, 0.07, 0.08, 0.09, 0.10, 0.15, 0.20, 0.25, 0.30, 0.35, 0.40, 0.45 or 0.50, or may be in a range between any two of the numerical values exemplified herein. When ω/α is too small, noise is conspicuous in a final output image O(x, y). On the other hand, when ω/α is too large, there is no difference from when the reflection rate is uniformly corrected. Thus attention is required in this matter.

<Emphasis Degree Determination Unit 37>

Figure 4A:
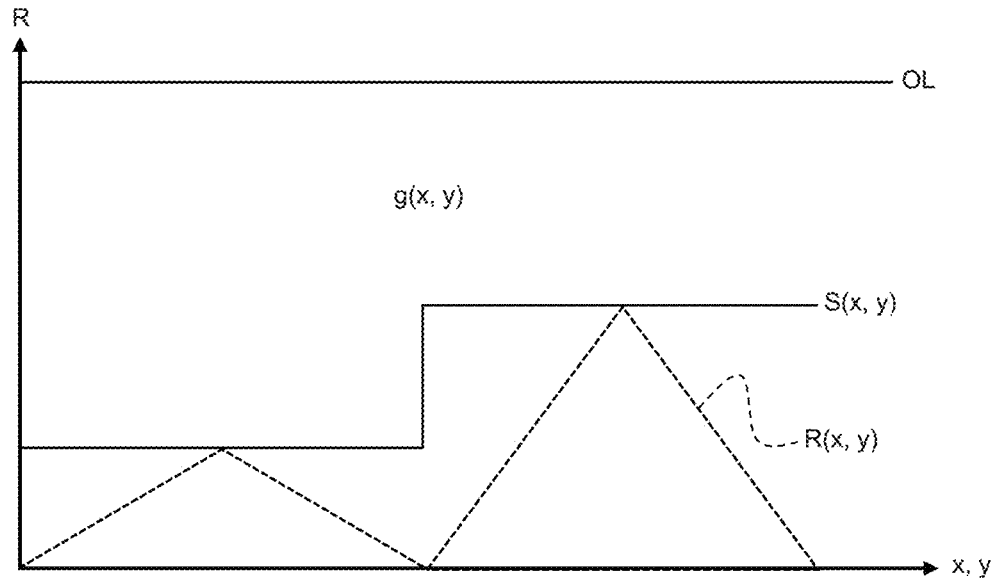
FIG. 4A and FIG. 4B are conceptual diagrams showing an aspect in which the emphasis degree determination unit determines an emphasis degree.
Figure 4B:
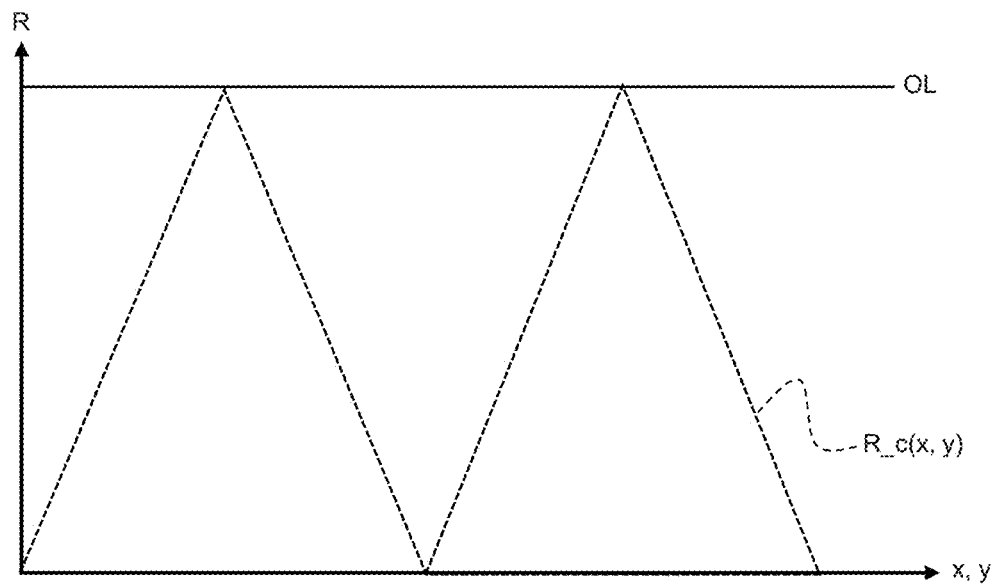

FIG. 4A and FIG. 4B are conceptual diagrams showing an aspect in which the emphasis degree determination unit 37 determines an emphasis degree g(x, y). The emphasis degree determination unit 37 is configured to compare the reference value S(x, y) calculated by the peripheral region reference value calculator 36 with a predetermined value (usually, an upper limit OL or a lower limit UL of the reflection rate R(x, y) that can be output as the output image O(x, y)) to determine the emphasis degree g(x, y). In FIG. 4A, g(x, y) is calculated from the difference between S(x, y) and OL by taking the case of R(x, y)≥0 as an example. The larger the difference is, the larger g(x, y) is obtained. As shown in FIG. 4B, a corrected reflection rate R_c(x, y) is defined by multiplying the reflection rate R(x, y) of the input image I(x, y) by the emphasis degree g(x, y). A more specific processing procedure will be described in detail again in Section 1.2.

It should be noted here that the emphasis degree g(x, y) is determined so as to increase the reflection rate R(x, y), and that the magnitude of the difference between the reference value S(x, y) and the upper limit OL depends on the magnitude of the emphasis degree g(x, y). In other words, the emphasis degree g(x, y) monotonically increases with respect to the difference between the reference value S(x, y) and the upper limit OL (an example of "monotonically non-decreasing" in the claims).

<Conversion Output Unit 38>

The conversion output unit 38 is configured to output the output image O(x, y) with a corrected contrast from the reflection rate R(x, y) extracted by the signal intensity extraction unit 35 and the emphasis degree g(x, y) determined by the emphasis degree determination unit 37. That is, the conversion output unit 38 outputs the output image O(x, y) using the above-mentioned corrected reflection rate R_c (x, y).

1.1.3 Display 4

The display 4 is a medium configured to display the image based on each pixel data (information, such as the luminance of each pixel) of the image data input after being image-processed by the image processing device 3, and may be, for example, an LCD monitor, a CRT monitor, an organic EL monitor or the like. In this regard, the image processing device 3 may be configured to include the display 4. More specifically, the output image O(x, y) output from the conversion output unit 38 of the image processing device 3 is transmitted to the display 4 via the communication bus 3B and the transmission and reception unit 34, and the display 4 displays the output image.

1.2 Image Processing Method

Next, an image processing method using the image processing device 3 described in Section 1.1 is described. In particular, the process by which the input image I(x, y) input from the transmission and reception unit 34 undergoes the image processing and the output image O(x, y) is output from the conversion output unit 38 is described in detail. In the processing described below, a given target pixel p_[i, j] of the input image I(x, y) (that is, the pixel having the pixel data I(i, j)) will be considered.

1.2.1 Extraction of Reflection Rate R(x, y)

Figure 5:
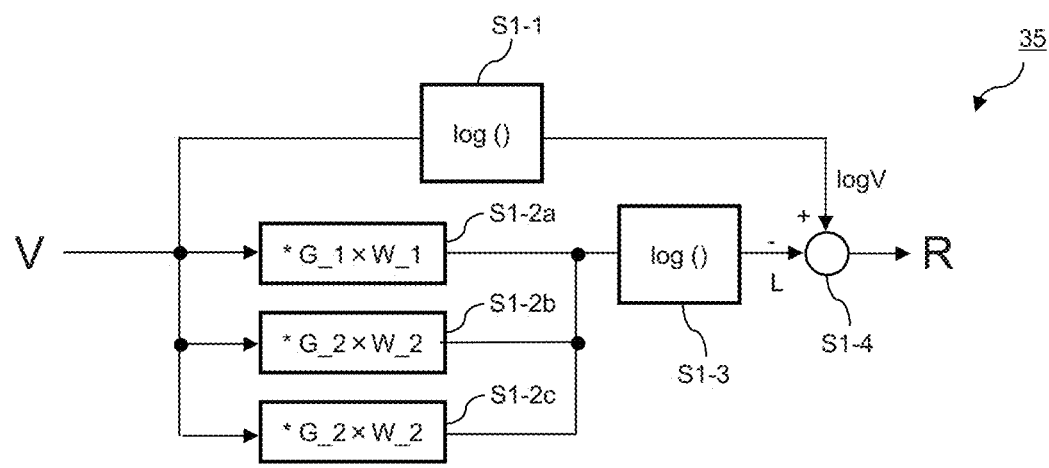
FIG. 5 is a block diagram showing a processing flow (in detail) of the signal intensity extraction unit according to a first embodiment.

FIG. 5 is a block diagram showing a processing flow (in detail) of the signal intensity extraction unit 35. Hereinafter, each step in FIG. 5 is described.

[Start]

(Step S1-1)

The brightness V(i, j) of the target pixels in an area of interest of the input image I(x, y) (here, all the pixels of the input image I: one frame in the case of a moving image) is respectively extracted, and its logarithmic value log{V(i, j)} is obtained (and then the process proceeds to Steps S1-2a to c).

(Steps S1-2a to c)

The extracted brightness V(i, j) is then multiplied by Gaussian filters G_1 to G_3 and weighting factors W_1 to W_3. In this regard, the Gaussian filters G_1 to G_3 have different kernel sizes, and the weighting factors W_1 to W_3 satisfy the equation (3) (and then the process proceeds to Step S1-3).

$$W\_1 + W\_2 + W\_3 = 1 \qquad (3)$$

(Step S1-3)

Next, a logarithmic value of each value obtained in Steps S1-2a to c is calculated, and the sum of the logarithmic values is taken to calculate an illumination light component L(i, j) (and then the process proceeds to Step S1-4).

(Step S1-4)

Next, the illumination light component L(i, j) calculated in Step S1-3 is subtracted from the logarithmic value log{ j)} obtained in Step S1-1 to extract the reflection rate R(i, j) as signal intensity.

[End]

1.2.2 Determination of Emphasis Degree g(x, y)

Figure 6:
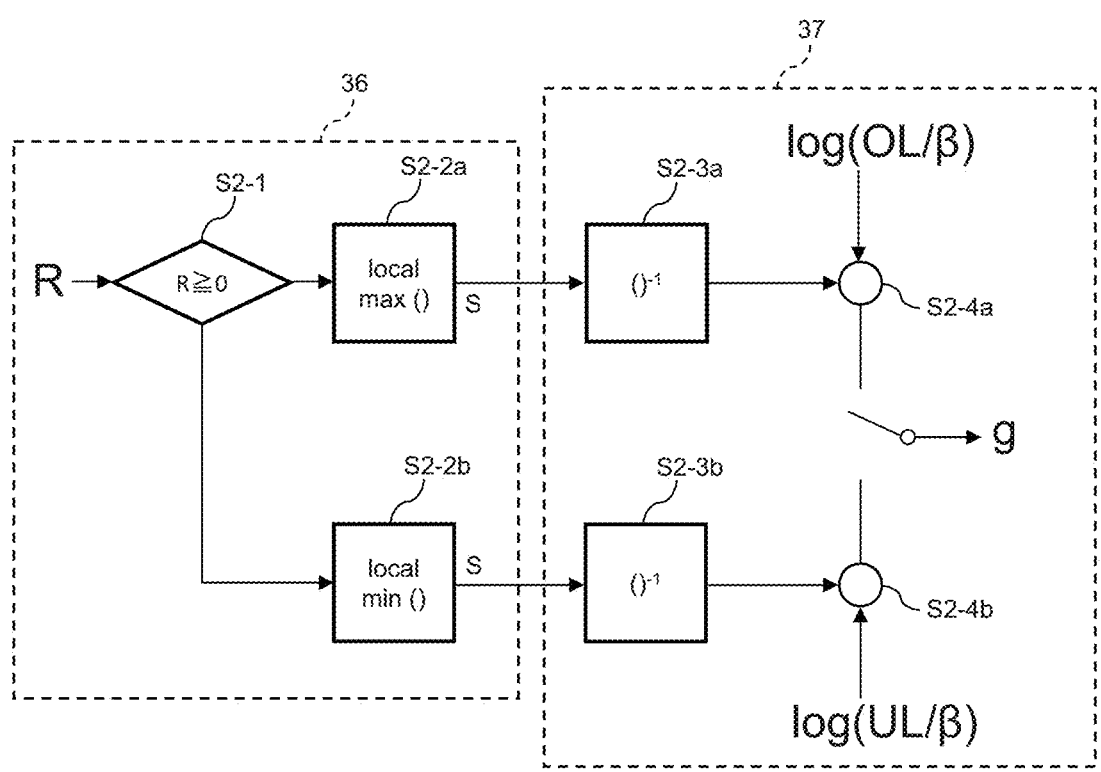
FIG. 6 is a block diagram showing a processing flow (in detail) of the peripheral region reference value calculator and the emphasis degree determination unit according to the first embodiment.

FIG. 6 is a block diagram showing a processing flow (in detail) of the peripheral region reference value calculator 36 and the emphasis degree determination unit 37. Hereinafter, each step in FIG. 6 is described.

[Start]

(Step S2-1)

The peripheral region reference value calculator 36 determines whether the reflection rate R(i, j) extracted by the signal intensity extraction unit 35 is 0 or more, or less than 0. When R(i, j)≥0, the process according to Step S2-2a is executed, and when R(i, j)<0, Step S2-2b is executed (and then the process proceeds to Steps S2-2a, b).

(Step S2-2a)

The peripheral region reference value calculator 36 determines the reference value S(i, j) corresponding to the reflection rate R(i, j). In other words, in the ROI defined for the target pixel p_[i, j], the maximum value R_M of the reflection rates R(x, y) of a plurality of pixels (the target pixel p_[i, j] and the peripheral region thereof) becomes the reference value S(i, j) (and then the process proceeds to Step S2-3a).

(Step S2-3a)

The emphasis degree determination unit 37 calculates 1/S(i, j), which is the reciprocal value of the reference value S(i, j) determined in Step S2-2a (and then the process proceeds to Step S2-4a).

(Step S2-4a)

The emphasis degree determination unit 37 calculates g(i, j) by multiplying the reciprocal value 1/S(i, j) by log(OL/β). Here, β represents a predetermined offset constant.

(Step S2-2b)

The peripheral region reference value calculator 36 determines the reference value S(i, j) corresponding to the reflection rate R(i, j). In other words, in the ROI defined for the target pixel p_[i, j], the minimum value R_m of the reflection rates R(x, y) of a plurality of pixels (the target pixel p[i, j] and the peripheral region thereof) is adopted.

(Step S2-3b)

The emphasis degree determination unit 37 calculates 1/S(i, j), which is the reciprocal value of the reference value S(i, j) determined in Step S2-2b (and then the process proceeds to Step S2-4b).

(Step S2-4b)

The emphasis degree determination unit 37 calculates g(i, j) by multiplying the reciprocal value 1/S(i, j) by log(UL/β). Here, β represents the predetermined offset constant.

[End]

1.2.3 Generation of Output Image O(x, y)

Figure 7:
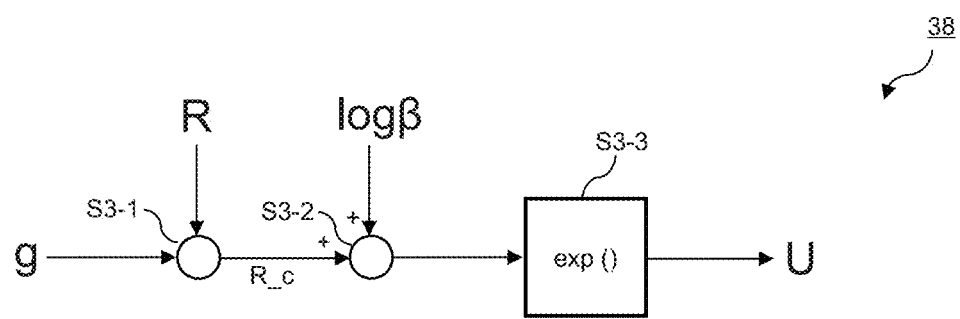
FIG. 7 is a block diagram showing a processing flow (in detail) of the conversion output unit.

FIG. 7 is a block diagram showing a processing flow (in detail) of the conversion output unit 38. Hereinafter, each step of FIG. 7 is described.

[Start]

(Step S3-1)

The conversion output unit 38 multiplies the emphasis degree g(i, j) determined by the emphasis degree determination unit 37 by the reflection rate R(i, j) to obtain the corrected reflection rate R_c(i, j) (and then the process proceeds to Step S3-2).

(Step S3-2)

log β is added to the corrected reflection rate R_c(i, j) obtained in Step S3-1 (and then the process proceeds to Step S3-3).

(Step S3-3)

The antilogarithm of the value obtained in Step S3-2 by adding log β to the corrected reflection rate R_c(i, j) is extracted to determine a corrected brightness U(i, j). That is, the pixel data O(i, j) of the target pixel p_[i, j] of the output image O(x, y) with a corrected contrast are determined while maintaining the color components, such as hue and saturation.

[End]

In this way, the processing according to each step described in detail in Sections 1.2.1 to 1.2.3 is repeated for each pixel, the output image O(x, y) obtained by image-processing the input image I(x, y) is output.

1.3 Examples

Examples of image processing using the image processing device 3 according to the first embodiment are described. For example, when an image shown in FIG. 8 is adopted as the input image I(x, y), the output image O(x, y) shown in FIG. 9 can be obtained by the image processing device 3 according to the first embodiment (Example). On the other hand, output images shown in FIG. 10A and FIG. 10B can be obtained by the image processing according to a prior art in which the emphasis degree is uniformly determined for all pixels (Comparative Examples).

The input image I(x, y) in FIG. 8 is characterized in that a left part has a relatively lower value of the reflection rate R(x, y) than a right part. For such an input image I(x, y), the output image O(x, y) in which the left part and the right part are each conspicuous can be obtained in Example shown in FIG. 9 by applying an appropriate emphasis degree g(x, y) respectively to the left part and the right part.

On the other hand, in Comparative Example shown in FIG. 10A, a relatively strong emphasis degree g(x, y) is uniformly applied. Consequently, the contrast on the left part is improved and the visibility is enhanced while the contrast on the right part has reached the limit and the visibility is not good. Further, in Comparative Example shown in FIG. 10B, an emphasis degree g(x, y) weaker than FIG. 10A is uniformly applied in order to suppress the contrast on the right part, so that the contrast of the left part is small and the visibility is poor. As described above, it has been confirmed that the image processing using the image processing device 3 according to the first embodiment, as compared to the prior art, can appropriately correct the contrast even for an image in which the amplitude of the reflection rate differs for each local area of the image and can generate the output image O(x, y) with higher visibility.

2. Second Embodiment

Next, the system 1 according to the second embodiment will be described. The overall configuration of the system 1 according to the second embodiment is the same as the system 1 according to the first embodiment. However, it should be noted that the image processing method of the signal intensity extraction unit 35 and the peripheral region reference value calculator 36 in the image processing device 3 is different. This difference is described below.

Figure 11:
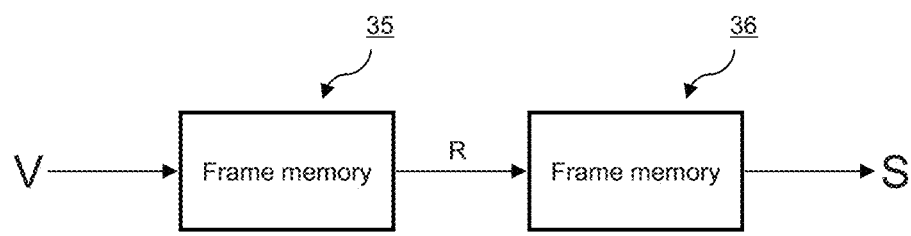
FIG. 11 is a schematic view showing the use of frame memories in a system using an image processing device according to the first embodiment.

In the image processing device 3 according to the first embodiment, the Gaussian filter G_n is used in the signal intensity extraction unit 35. Since the Gaussian filter G_n also uses the pixel data of the pixels around the target pixel p_[i, j] for operation, it is necessary to store the surrounding pixel data in the operation of the target pixel p_[i, j]. Similarly, it is necessary to store the pixel data of the pixels around the target pixel p_[i, j] for the peripheral region reference value calculator 36 when the local_max( ) filter and the local_min ( )filter are used. In such a case, a frame memory is generally used. That is, as shown in FIG. 11, the frame memory is used at two timings in the image processing device 3 according to the first embodiment.

Figure 12:
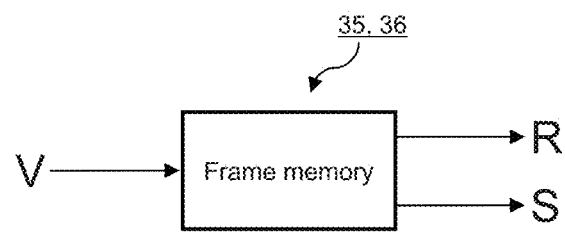
FIG. 12 is a schematic view showing the use of a frame memory in a system using an image processing device according to a second embodiment.
Figure 13:
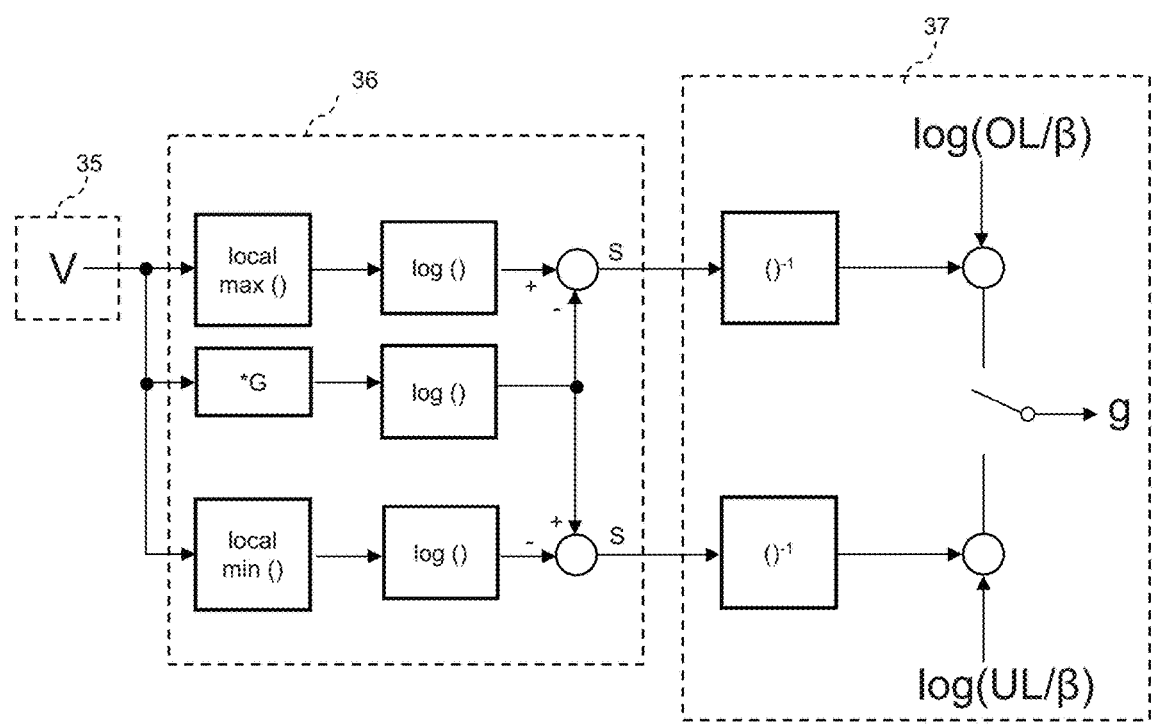
FIG. 13 is a block diagram showing a processing flow (in detail) of the signal intensity extraction unit, the peripheral region reference value calculator, and the emphasis degree determination unit according to the second embodiment.

On the other hand, the image processing device 3 according to the second embodiment is devised to use the frame memory only once, as shown in FIG. 12. Specifically, the reference value S(i, j) is approximately derived for the target pixel p_[i, j] of the input image I(x, y) without deriving the reflection rate R(i, j) from the brightness V(i, j) (see FIG. 13).

Specifically, the Gaussian filter, the local_max( )filter, and the local_min( ) filter used also in the image processing device 3 according to the first embodiment are used at once. That is, when these filters are applied to the brightness V(i, j), and the logarithmic value thereof is calculated, the difference between log{local_max(V(i, j))} and log{G*V(i, j)} or the difference between log {local_min(V(i, j))} and log{G*V(i, j)} is derived as the reference value S(i, j).

3. Modified Examples

The present embodiment can be implemented in the following aspects.

Firstly, although the range of the image processing (area of interest) in the present embodiment is described as all the pixels of the input image I(x, y) (one frame in the case of the moving image), the pixels to be used may be partially selected. For example, the area of interest may be a partial rectangular region. Or, a reduced image may be generated by appropriately selecting a representative pixel for each rectangular small region of a predetermined size. For example, the representative pixel is a specific position, such as the upper left of the small region, or a median value in the small region. Then, the reduced image generated may be taken as the area of interest.

Secondly, when determining the reference value S(i, j), R_M±ΔR_M or R_m±ΔR_m, which include neighborhood errors of R_M and R_m, may be adopted instead of the maximum value R_M or the minimum value R_m of the reflection rates R(x, y) of the plurality of pixels of the ROI (the target pixel p_[i, j] and its peripheral region). The neighborhood errors preferably satisfy, for example, the conditions of:

$$0 \leq \Delta R\_M \leq R\_M/20 \quad (4)$$

$$0 \leq \Delta R\_m \leq R\_m/5 \quad (5)$$

Specifically, for example, ΔR_M/R_M may be equal to 0.001, 0.002, 0.003, 0.004, 0.005, 0.01, 0.02, 0.03, 0.04 or 0.05, or the value may be in a range between any two of the numerical values exemplified herein. Further, ΔR_m/R_m may be equal to 0.01, 0.02, 0.03, 0.04, 0.05, 0.10, 0.15 or 0.20, or the value may be in a range between any two of the numerical values exemplified herein.

Thirdly, the emphasis degree determination unit 37 may determine the emphasis degree g(x, y) based on a predetermined value T instead of the upper limit OL or the lower limit UL. In such a case, the predetermined value T satisfies the following conditions (6) and (7).

$$S(x,y) \leq T \leq OL, \text{ when } R \geq 0 \quad (6)$$

$$UL \leq T \leq S(x,y), \text{ when } R < 0 \quad (7)$$

Fourthly, although the image processing is executed for each target pixel p_[i, j] in the present embodiment, the image processing may be executed for each small region including a plurality of target pixels.

Fifthly, although the two-dimensional array is assumed in the above-described various kinds of processing, the data may be stored as a one-dimensional array during operation as long as a desired image can be finally displayed on the display 4. Further, instead of using the one-dimensional array or the two-dimensional array, the operations may be sequentially performed.

Sixthly, the above-described image processing may be executed by adjusting at least one of the emphasis degree g(x, y) for adjusting the reflection rate R(x, y) and an illumination light adjustment parameter for adjusting the illumination light component. That is, in consideration of I(x, y)=L(x, y)R(x, y), which is a relational expression in the Retinex theory, a means for increasing the value of R(x, y) by the emphasis degree g(x, y), a means for increasing the value of L(x, y) by the illumination light adjustment parameter instead of increasing the value of R(x, y) to result in achieving the same effect as increasing R(x, y), or a means combining both of them may be adopted.

Seventhly, the present invention can also provide an image processing program for causing a computer to perform a predetermined function, the predetermined function comprising the functions of: extracting signal intensity of an input image; calculating a peripheral region reference value based on the signal intensity of a peripheral region located around a small region of interest; and determining an emphasis degree of the signal intensity so as to increase the signal intensity of the small region, wherein the signal intensity is defined as predetermined pixel data included in the input image input to the computer; the small region is defined as a region which is a part of the input image and comprises at least one pixel; and the emphasis degree monotonically increases with respect to a difference between the peripheral region reference value and a predetermined value. Further, the present invention can provide a non-transitory computer readable storage medium in which the functions of the program are implemented. The program may be distributed via the Internet or the like. In addition, each unit of the system 1 may be included in the same enclosure or may be distributed in multiple enclosures.

4. Conclusions

As described above, the present embodiment can provide an image processing device, an image processing method, and an image processing program capable of appropriately correcting the contrast even for an image in which the amplitude of the reflection rate differs for each local area of the image.

While various embodiments according to the present invention have been described, these are presented as examples and are not intended to limit the scope of the invention. The novel embodiment can be implemented in various other forms, and various omissions, replacements, and changes can be made without departing from the scope of the invention. The embodiments and the modifications thereof are included in the scope and gist of the invention and are included in the invention described in the claims and the equivalents thereof.

REFERENCE SIGN LIST

1: system, 2: input image source, 3: image processing device, 3B: communication bus, 31: control unit, 32: storage unit, 33: input unit, 34: transmission and reception unit, 35: signal intensity extraction unit, 36: peripheral region reference value calculator, 37: emphasis degree determination unit, 38: conversion output unit, 4: display, G_n: Gaussian filter, I: input image, L: illumination light component, 0: output image, OL: upper limit, R: reflection rate, R_M: maximum value, R_c: reflection rate, R_m: minimum value, S: reference value, T: predetermined value, U: brightness, UL: lower limit, V: brightness, W_n: weighting factor, g: emphasis degree

The invention claimed is:
1. An image processing device, comprising:
a signal intensity extraction unit executing an operation on an input image input to the image processing device and calculating a reflection rate of the input image as signal intensity;
a peripheral region reference value calculator calculating, for each small region, a peripheral region reference value based on the signal intensity of a peripheral region located around the small region of interest;
an emphasis degree determination unit determining an emphasis degree of the signal intensity to correct and increase the signal intensity of the small region; and
a conversion output unit obtaining a corrected value of the signal intensity of the small region using the emphasis degree,
wherein
the small region is defined as a region which is a part of the input image and further comprises at least one pixel, and
the emphasis degree is monotonically non-decreasing with respect to a difference between the peripheral region reference value and a predetermined value, and further satisfying conditions of:

$S \leq T \leq OL$, when $R \geq 0$, and $UL \leq T \leq S$, when $R<0$, wherein R represents the signal intensity of the small region of interest, S represents the peripheral region reference value, T represents the predetermined value, and OL and UL respectively represent an upper limit and a lower limit of the signal intensity that can be output as an output image.

2. The image processing device of claim 1, wherein the signal intensity is calculated on the basis of a reflected light component and an illumination light component separated from the input image input to the image processing device.

3. An image processing method, comprising:

extracting signal intensity of executing an operation on an input image input to the method and calculating a reflection rate of the input image as signal intensity;

calculating, for each small region, a peripheral region reference value based on the signal intensity of a peripheral region located around the small region of interest;

determining an emphasis degree of the signal intensity to correct and increase the signal intensity of the small region; and obtaining a corrected value of the signal intensity of the small region using the emphasis degree, wherein the small region is defined as a region which is a part of the input image and comprises at least one pixel, and the emphasis degree is monotonically non-decreasing with respect to a difference between the peripheral region reference value and a predetermined value, and further satisfying conditions of:

$S \leq T \leq OL$, when $R \geq 0$, and $UL \leq T \leq S$, when $R \leq 0$, wherein R represents the signal intensity of the small region of interest, S represents the peripheral region reference value, T represents the predetermined value, and OL and UL respectively represent an upper limit and a lower limit of the signal intensity that can be output as an output image.

4. A non-transitory computer-readable storage medium storing an image processing program for causing a computer to perform a predetermined function, the predetermined function comprising the functions of:

executing an operation on an input image input to the method and calculating a reflection rate of the input image as signal intensity;

calculating, for each small region, a peripheral region reference value based on the signal intensity of a peripheral region located around the small region of interest;

determining an emphasis degree of the signal intensity to correct and increase the signal intensity of the small region; and obtaining a corrected value of the signal intensity of the small region using the emphasis degree, wherein the small region is defined as a region which is a part of the input image and comprises at least one pixel, and the emphasis degree is monotonically non-decreasing with respect to a difference between the peripheral region reference value and a predetermined value, and further satisfying conditions of:

$S \leq T \leq OL$, when $R \geq 0$, and $UL \leq T \leq S$, when $R<0$, wherein R represents the signal intensity of the small region of interest, S represents the peripheral region reference value, T represents the predetermined value, and OL and UL respectively represent an upper limit and a lower limit of the signal intensity that can be output as an output image.

* * * * *